United States Patent [19]
Waters

[11] Patent Number: 5,477,812
[45] Date of Patent: Dec. 26, 1995

[54] AUTOMATED SELF-CLEANING LITTER BOX FOR CATS

[75] Inventor: Michael A. Waters, Barrington Hills, Ill.

[73] Assignee: Waters Research Company, Elgin, Ill.

[21] Appl. No.: 371,782

[22] Filed: Jan. 12, 1995

[51] Int. Cl.[6] ................................................. A01K 1/035
[52] U.S. Cl. ............................................ 119/163; 119/166
[58] Field of Search ................................... 119/163, 164, 119/166, 161, 165

[56] References Cited

U.S. PATENT DOCUMENTS

| | | | |
|---|---|---|---|
| 3,734,057 | 5/1973 | Lee et al. | 119/163 |
| 3,811,410 | 5/1974 | Roberts | 119/163 |
| 4,096,827 | 6/1978 | Cotter. | |
| 4,117,804 | 10/1978 | Moore et al. | |
| 4,190,525 | 2/1980 | Menzel. | |
| 4,325,325 | 4/1982 | Larter. | |
| 4,325,822 | 4/1982 | Miller. | |
| 4,658,720 | 4/1987 | Massonnet | 220/908 |
| 4,729,342 | 3/1988 | Loctin | 119/163 |
| 4,934,317 | 6/1990 | Pourshalchi | 119/165 |
| 4,949,672 | 8/1990 | Yamamoto | 119/169 |
| 5,048,465 | 9/1991 | Carlisi. | |
| 5,107,797 | 4/1992 | La Roche | 119/163 |
| 5,184,575 | 2/1993 | Reinartz | 119/163 |
| 5,226,388 | 7/1993 | McDaniel. | |
| 5,249,549 | 10/1993 | Rockaitis, III. | |

FOREIGN PATENT DOCUMENTS

154540  9/1985  European Pat. Off. ............... 119/166

Primary Examiner—Todd E. Manahan
Attorney, Agent, or Firm—Dorn, McEachran, Jambor & Keating

[57] ABSTRACT

An improved automated self-cleaning litter box for cats, of the kind having a housing defining an upwardly open chamber for storage of a supply of cat litter, accessible to a cat and having path members on opposed side walls defining a comb path from one end of the chamber to the other. A comb, normally stored at the comb storage end of the chamber, is driven forward along the path to the discharge end of the chamber and back to its original storage position. As the comb traverses the chamber forwardly it engages any clumps of waste in the litter and carries them to a disposal receptacle at the discharge end of the chamber. The improvement includes a sensor for sensing the presence of a cat in the litter chamber; a photo electric sensor is preferred, but an infra red, weight, or even an audible sensor can be used. A delay device actuates the comb drive a predetermined time interval after the sensor ceases to sense the presence of a cat in the litter chamber. In the improved construction the comb path includes multi-perforate track members on opposite sides of the litter chamber; those tracks are engaged by rotatable drive wheels connected to the comb. The comb drive includes a reversible electric motor, mounted on the same carriage as the comb. A transparent, biodegradable receptacle is used; alarms for a full receptacle and for an insufficient litter supply are provided.

22 Claims, 7 Drawing Sheets

AUTOMATED SELF-CLEANING LITTER BOX FOR CATS

BACKGROUND OF THE INVENTION

Cats, which are among the most popular types of domestic pets, are usually trained to use a litter box for elimination of both liquid and solid wastes. A cat litter box is normally made of plastic or like material so that a cat's urine will not leak through the box. Other types of cat litter box have been proposed, as in the construction described in Rockaitis U.S. Pat. No. 5,249,549, in which the litter box is made of a material that absorbs liquid but does not permit it to leach through to the exterior of the box. The litter used in boxes of this kind may be one of any number of particulate litter materials that absorb moisture from the waste of the cat and that may also suppress odor from cat wastes. Some forms of cat litter form clumps when wet. Usually, a cat will bury its solid waste in the litter material in the box.

Most cat owners take appropriate action to discard the litter from a cat litter box after an appreciable period of time, often several days. On the other hand, even before the litter has been thoroughly saturated with wastes from the cat or cats that use it, a cat may be inclined to push some of the litter out of the box, particularly if the odor is strong. In any event, the person using a cat litter box, usually the owner of the cat or cats, may find the task of emptying the cat litter to be personally obnoxious. Thus, a number of prior art devices have been proposed for cleaning cat litter boxes; devices of this kind are disclosed in U.S. Pat. No. 4,096,827, No. 4,117,804, No. 4,190,525, No. 4,325,325, No. 4,325,822, and No. 5,226,388. Perhaps the best of these devices is disclosed in Carlisi U.S. Pat. No. 5,048,465.

The self-cleaning cat litter box disclosed in the Carlisi patent utilizes a rake or comb that is normally maintained in a storage position at one end of the litter chamber. This comb is moved through the litter, periodically, from the rake storage end of the chamber to the opposite end, which constitutes a discharge end for the chamber. At the discharge end of the chamber the rake moves up out of the litter and discharges any clumps collected by the comb into a disposal receptacle. The present invention provides effective improvement for the rake drive of the Carlisi device so that movement of the comb or rake through the litter can be made responsive to entry and exit of the cat from the litter box. Cats are no more constant in their elimination habits than human beings; periodic cleaning may be inappropriate. The invention also provides for improvements in the disposal receptacle, which may also serve as a container for a new litter supply. Alarms are also provided for an insufficient litter supply and a full disposal receptacle.

SUMMARY OF THE INVENTION

It is a principal object of the present invention, therefore, to provide a new and improved drive for a rake or comb employed to remove litter from a cat litter box, a drive that is directly responsive to the exit of a cat from the litter box.

Another object of the invention is to provide a new and improved drive for a self-cleaning cat litter box that is capable of remaining in, operation for extended periods of time without attention from the cat owner and that does not operate on a periodical basis so that there is no substantial possibility that the comb mechanism will carry out a cleaning operation while a cat is present in the litter box.

Another object of the present invention is to provide a new and improved drive for an automated self-cleaning cat litter box that is simple and economical in construction and that can afford an extended operating life, requiring little or no attention apart from battery replacement.

Further objects of the invention are to provide an improved waste receptacle, an alarm signalling an inadequate litter supply in the litter box, and an alarm signalling that the waste receptacle is full.

DESCRIPTION OF THE PREFERRED EMBODIMENT

Figure 1:
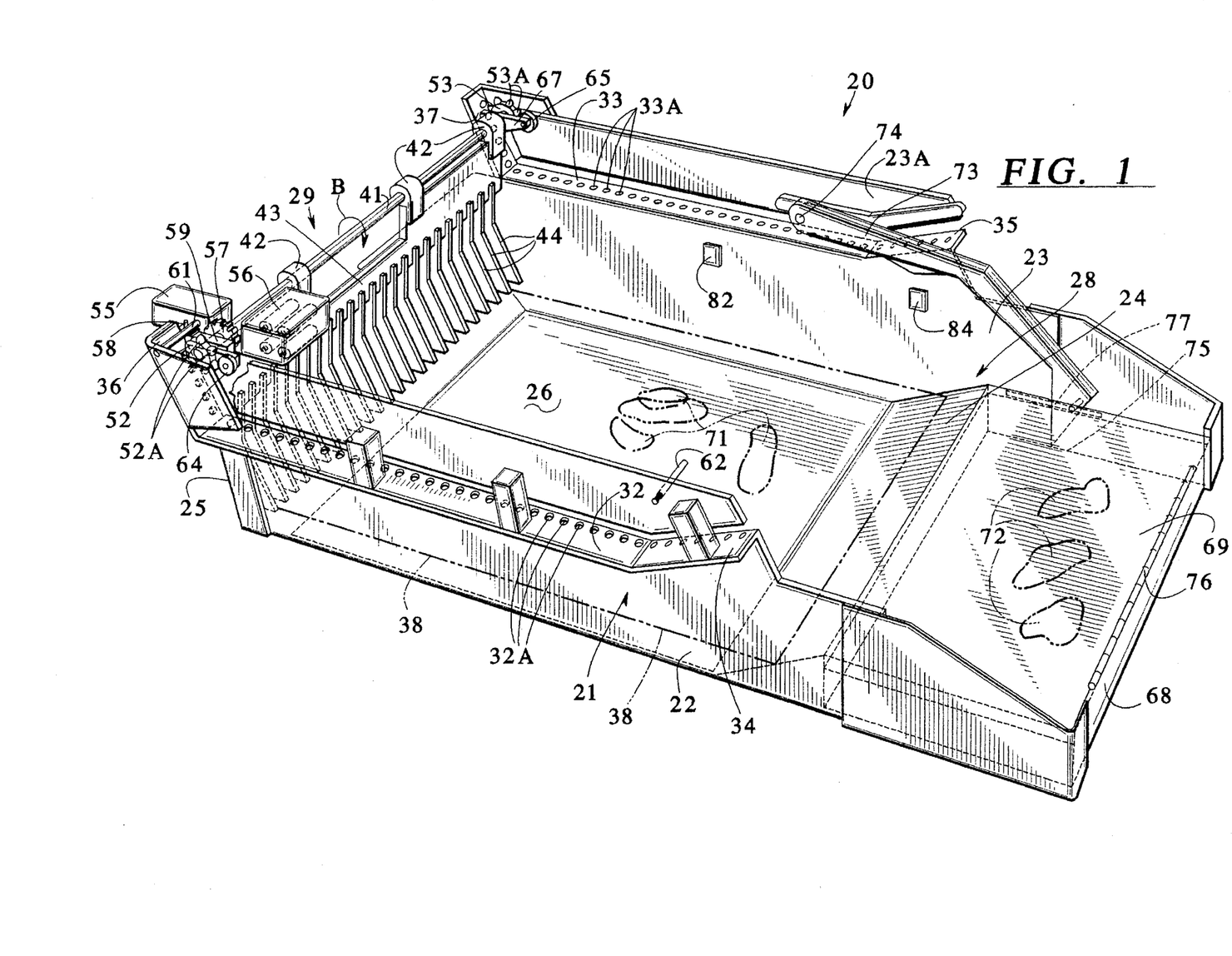
FIGS. 1, 2 and 3 are perspective views of an automated self-cleaning litter box for use by a cat, constructed in accordance with a preferred embodiment of the invention, showing the litter box at three distinct stages of operation.
Figure 2:
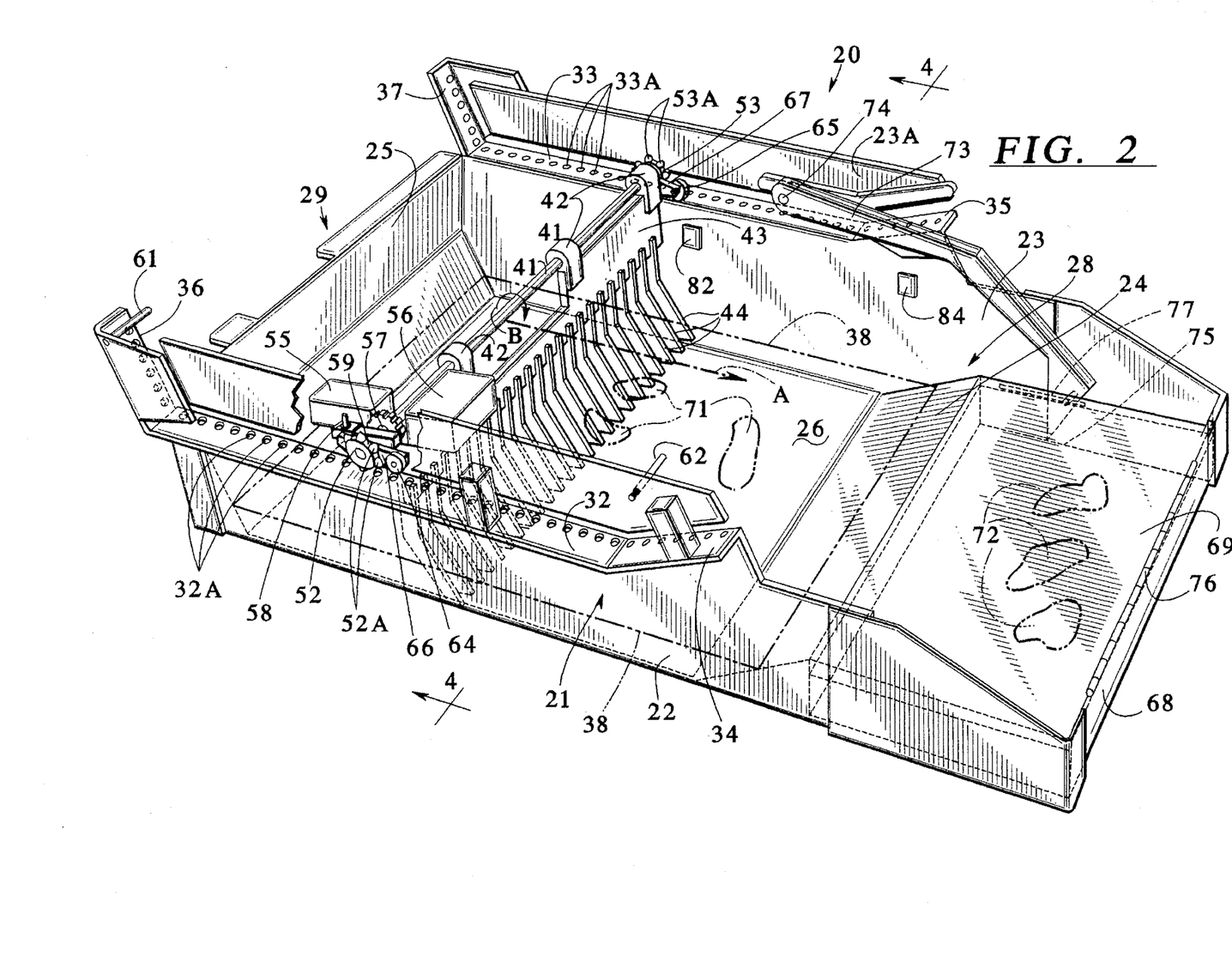
Figure 3:
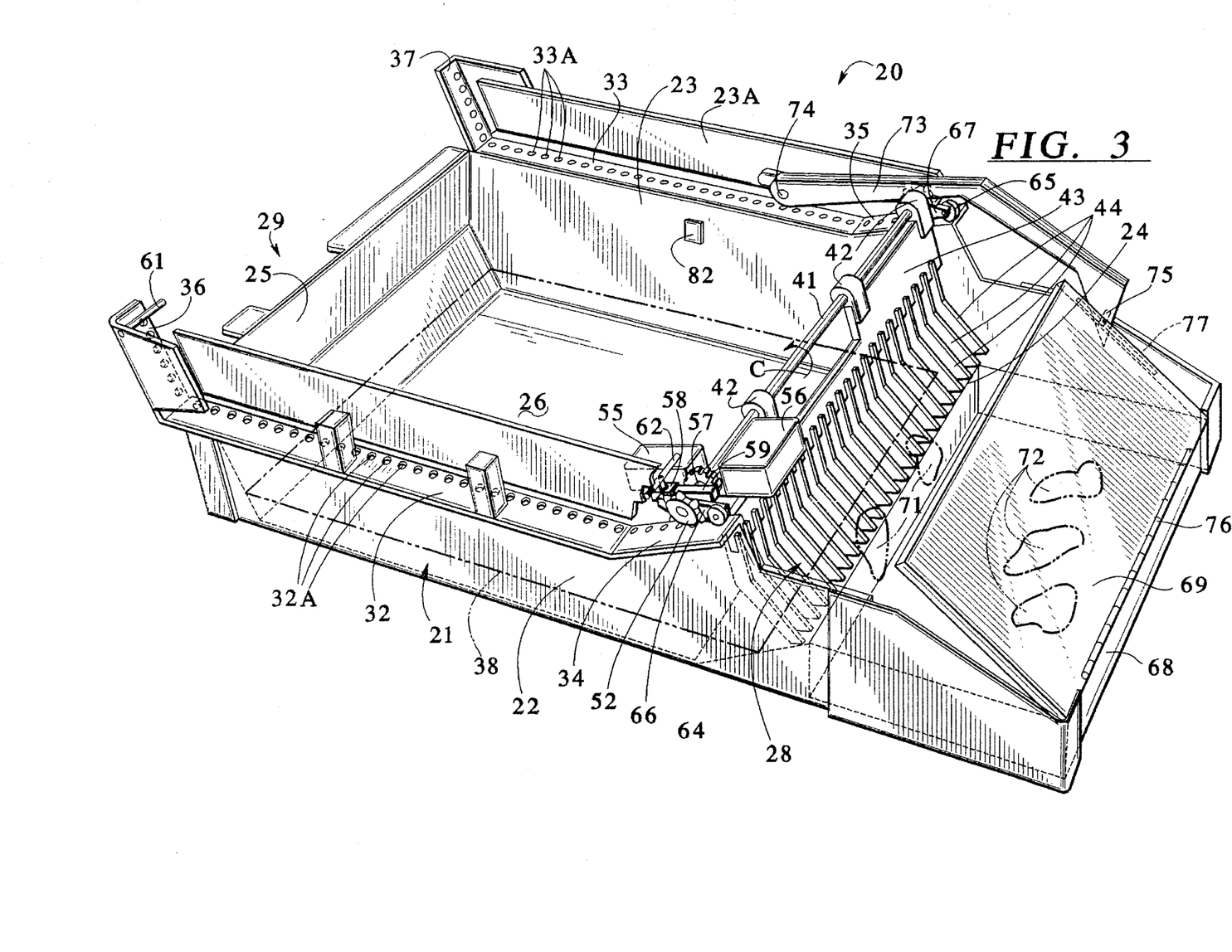

FIGS. 1–3 illustrate successive positions for the operating mechanism of la cat litter box 20 that affords automated self-cleaning operation. Litter box 20 comprises a pan-shaped housing 21 having a near side wall 22, a far side wall 23, a discharge end wall 24 joining walls 22 and 23 at one end of the litter box and a comb storage end wall 25 connecting walls 22 and 23 at the other end of litter box 20. The bottom of litter box 20 is identified by reference numeral 26 and the fill level to which box 20 is usually filled with cat litter is shown by phantom line 38. Thus, in litter box 20 there is a discharge end 28 at one end of the litter box and a comb storage end 29 at the opposite end of the litter box. Litter level line 38 may be afforded by a continuous or interrupted ridge in the interior of housing 21, as discussed in regard to FIG. 8. All of the members 22–26 are preferably formed in a molding operation that produces the complete housing 21.

An elongated near Side track or path member 32 extends along the top of the near side wall 22 of housing 21, FIGS. 1–4. Track member 32 includes a multiplicity of equally spaced apertures 32A. Apertures 32A extend through an inclined portion 34 of rack 32 at the discharge end 28 of litter box 20; they also extend through a more steeply inclined portion 36 of rack 32 at the comb storage end 29 of the litter box. This track construction is repeated on the opposite side of housing 21. Thus, an elongated track member 33 projects horizontally from the vertical side wall 23. Track member 33 includes a multiplicity of equally spaced apertures or perforations 33A. The pattern of apertures extends along an inclined portion 35 of track member 33 at the discharge end 28 of litter box 20. It also extends along a more steeply inclined portion 37 of track 33 located at the comb discharge end 29 of litter box 20.

A comb shaft 41 extends across litter box 20 between its two side tracks 32 and 33. In FIG. 1 shaft 41 is located at the comb storage end 29 of the litter box. In FIG. 2 shaft 41 is positioned at about the middle of the litter box. In FIG. 3 shaft 41 is shown near the end of its movement at the discharge end 28 of litter box 20. There are four hangers 42 journalled on and depending from shaft 41; three of these hangers appear in FIGS. 1–3 and the fourth can be seen in FIG. 4. A comb or rake 43 is suspended from hangers 42. Comb 43 has a multiplicity of tines 44. When comb 43 is in its storage position, as shown in FIG. 1, tines 44 are elevated above the litter fill level 38. When rack 43 is moving across litter box 20, as indicated by arrow A in FIG. 2, the lower ends of the tines 44 project down into the litter in box 20, close to the bottom 26 of the box. See FIG. 4. At the discharge end of litter box 20, the tines 44 of comb 43 again move upwardly out of the litter.

A first main guide wheel 52 is affixed to the near end of shaft 41, as seen in FIGS. 1–3. Guide wheel 52 includes a plurality of radially projecting guide pins or teeth 52A engageable in the apertures 32A of track member 32 and its extensions 34 and 36. At the other end of shaft 41 there is a similar main guide wheel 53. The radial projections 53A on guide wheel 53 are engageable in the apertures 33A of track member 33 and its extensions 35 and 37. Guide wheels 52 and 53 cause the ends of shaft 41 to move along tracks 32 and 33, based on rotation of shaft 41, from the storage position of FIG. 1 through the intermediate position of FIG. 2 to the discharge position of FIG. 3 and back to the storage position, FIG. 1.

The improved self-cleaning cat litter box 20, FIGS. 1–3, includes a comb drive that comprises a reversible electric motor 55 mounted on and connected in driving relationship to the shaft 41 that supports comb 43; the final gear 57 of the gear train that connects motor 55 to shaft 41 is the only gear that appears in the drawings, FIGS. 1–3. In the construction illustrated in the drawings, motor 55 is energized from batteries contained in a battery case 56. Motor 55 and the gear train represented by gear 57, as well as battery case 56, are supported by shaft 41; in conjunction with the shaft, they constitute the carriage for the comb 43 in litter box 20. A reversing switch 58 is mounted on and electrically connected to motor 55. A lever 59 is mechanically connected to reversing switch 58. Lever 59 has a limited pivotal movement, from the position shown in FIG. 1 to the position illustrated in FIG. 2. A first switch actuation pin 61 is located adjacent the comb storage end 29 of litter box 20. A similar fixed switch actuation pin 62 is positioned at the other end, the discharge end 28, of litter box 20.

In addition to the main guide wheels 52 and 53 referred to above, the drive and guidance system of litter box 20 includes two auxiliary guide wheels 64 and 65, located on the near and far sides of the litter box, respectively, as seen in the drawings. Auxiliary guide wheel 64 is mounted at the end of a lever 66 that projects from one of the hangers 42 used to suspend comb 43 from shaft 41. Auxiliary guide wheel 64 rides along track 32 throughout the length of that track, including its upwardly inclined end sections 34 and 36. Similarly, the auxiliary guide wheel 65 is mounted on a lever 67 and engages the other track member 33 and its extensions 35 and 37. See FIG. 4.

As shown in FIGS. 1–3, the improved automated self-cleaning cat litter box 20 is provided with a waste receptacle 68 positioned immediately adjacent the discharge end 28 of the litter box. Receptacle 68 has a hinged lid 69. Waste receptacle 68 and its lid 69 are preferably formed of a biodegradable material. Moreover, receptacle 68 should be transparent; alternatively, lid 69 may be transparent or, of course, both may be transparent enough to permit the user to visually check the level of waste and litter in the receptacle. Lid 69 is engaged by a pin 75 on a lid lift lever 73 that is pivotally secured to a vertical extension 23A of side wall 23. The pivotal connection is indicated at 74. There need be no comparable lid lift mechanism 73–75 at the near side of the machine, though one could be provided if motor 55 and battery case 56 were mounted closer to the center of the litter box. In FIGS. 1 and 2 waste clumps 71 are indicated in the litter chamber; similar clumps 72 are shown, in FIGS. 1–3, as being already deposited in receptacle 68.

Waste receptacle 68 may be formed of plastic or other suitable material. The lid 69 for receptacle 68 is hinged to the receptacle as indicated at 76. A hinge of the so-called "piano" type may be used, but other hinge structures are acceptable. Lid 69 may also be formed of plastic. On the other hand, receptacle 68 and its lid 69 may be fabricated of other appropriate material. Preferably, receptacle 68 initially serves as a container for clean litter so that, once the receptacle is ready to be discarded, it can simply be removed and a new receptacle put in place after emptying clean litter from the new waste receptacle into the chamber afforded by housing 21.

Figure 4:
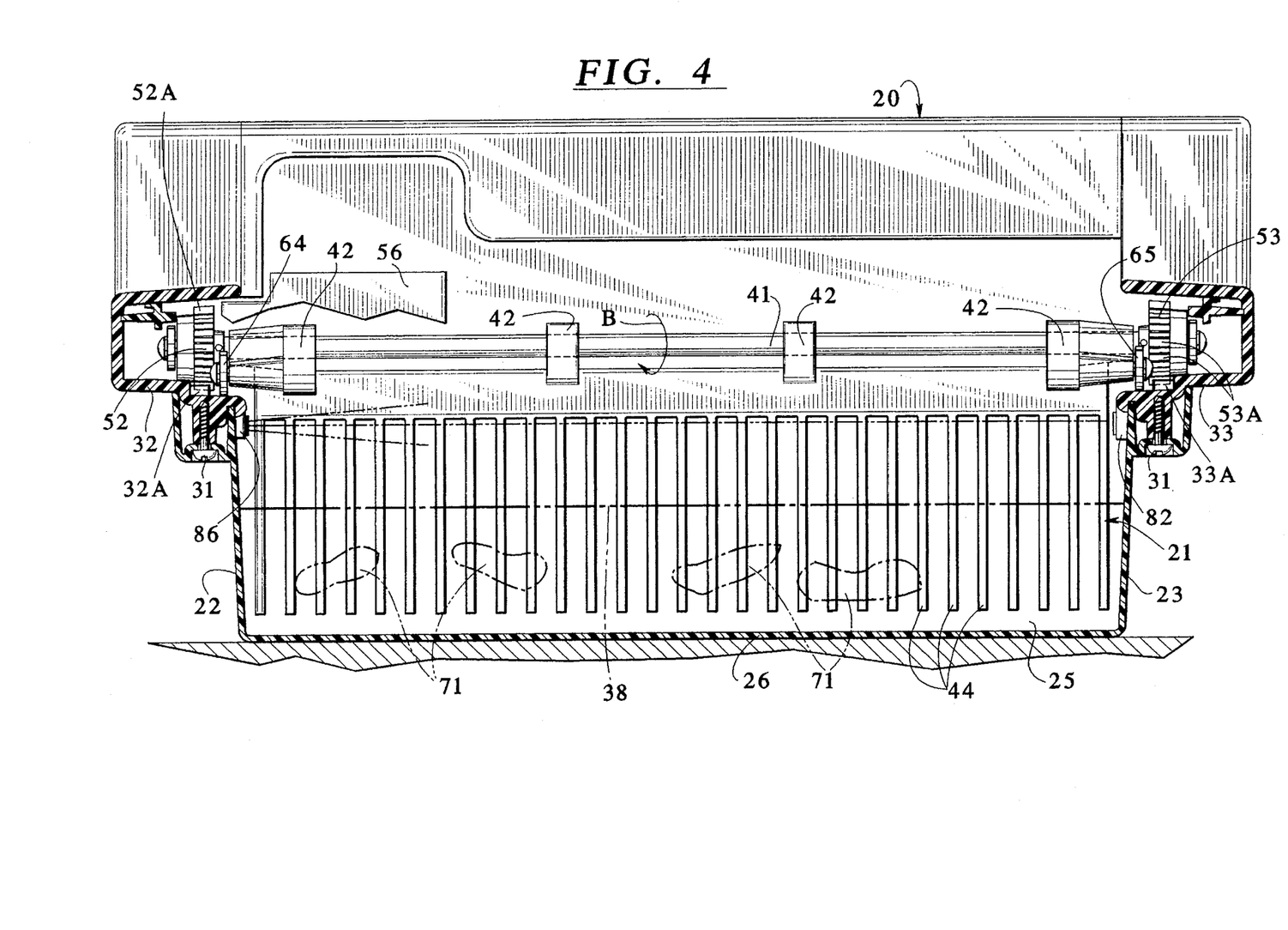
FIG. 4 is a transverse sectional view taken approximately along line 5—5 in FIG. 2.

The improved automated self-cleaning litter box 20 further comprises a sensor utilized to sense the exit of a cat from the litter chamber afforded by housing 21. In the embodiment of FIGS. 1–3 there are two such sensors 82 and 84, both mounted on wall 23 above the fill line 38 for litter. Devices 82 and 84 may comprise conventional photo detectors, each receiving a light beam from a source not shown in FIGS. 1–2. FIG. 4 shows an appropriate light source 86 mounted on wall 22 above fill level 38. Photo detector 82, FIG. 4, is also located above fill level 38. A single light source located centrally along the length of wall 22 can be used or there may be two such light sources 86, one for each of the photo detectors 82 or 84.

Figure 5:
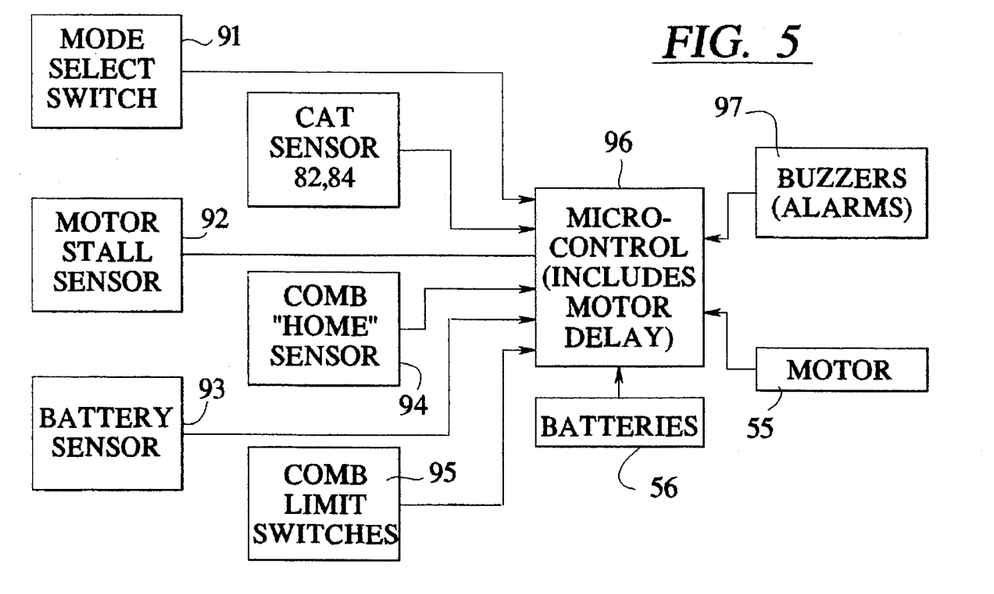
FIG. 5 is a block diagram of the drive and control for the litter box of FIGS. 1–3.

A block diagram for the operating circuit of the improved automated self-cleaning litter box 20 is presented in FIG. 5. As shown therein, motor 55 is energized from battery 56 through a pre-programmed micro-processor control 96. Micro control 96 receives input signals from cat sensors 82 and 84. Additional inputs to control 96 may be supplied by a mode select switch 91, a motor stall sensor 92, a battery voltage sensor 93, and a home position sensor 94 for comb 43. Limit switches 95 may be provided for the comb at the storage end 28 of litter box 20 and at the discharge end 29 of the litter box. One or more buzzers or other alarm devices 97 are included in the circuit so that the cat owner can be signalled when the litter box is functional or when other conditions occur, such as an insufficient litter supply in box 20 or a full waste receptacle 68. Circuit components 91–93 and buzzer 97 may all be packaged in the same housing with motor 55. Sensor 94 and limit switches 95 can be incorporated in litter box 20 in appropriate positions as desired.

In considering operation of the improved automated self-cleaning litter box 20 of FIGS. 1–4, the best starting point is FIG. 1, which shows the litter box in its normal condition, applicable most of the time. Comb 43 is located at the comb storage end 29 of litter box 20. Comb shaft 41 is elevated, guide wheels 52 and 53 having ridden up the extensions 36 and 37 of tracks 32 and 33. Switch 58 and lever 59 have engaged pin 61; motor 55 is shut off, but is set for forward movement. Housing 21 is filled with litter, approximately to level 38. Photo detectors 82 and 84 receive light beams from sources 86 on the near wall 22 of the litter box (see FIG. 4). With no cat present in the litter box, reception of the light beams by photo detectors 82 and 84 is unimpeded. All other mechanisms are in the positions shown. Lid 69 is closed over receptacle 68. The receptacle lid is engaged by pin 75 at the end of lever 73 but remains closed because the lid opening lever 73 is inactive.

At this juncture, it may be assumed that a cat (not illustrated) enters litter box 20 for the purpose of elimination of either liquid or solid waste. With some kinds of litter, the urine from the cat creates a clump in the litter with which the bottom portion of housing 21 is filled. Of course, for solid elimination, the clump is formed by the waste itself. In either instance, the cat is likely to bury the waste or to cover it with other litter. This is almost invariably true with respect to solid waste. Thus, clumps 71 are produced by the cat, and those clumps are located at some level in the litter above the bottom 26 of litter box 20. It is assumed that the box has previously been used and that previously deposited waste clumps 72 are already present in the waste receptacle 68.

While the cat is present in the litter box, the light beam to at least one of the photo detectors 82 and 84 is cut off. Usually, both light beams are blocked. However, this does not initiate a self-cleaning operation in litter box 20. Subsequently, when the Cat leaves the litter box the light beam or beams again impinge upon the photo detectors. Accordingly, an output signal from one or both cat sensors is supplied to micro control 96 (FIG. 5). At this point, however, there still is no actuation of a self-cleaning operation in box 20 by comb 43. The reason for the delay is that the cat might return to the litter box, deciding that its elimination activities have not been completed. In these circumstances, the light beams to one or both of the photo detectors 82 and 84 are again cut off and the preset delay interval for actuation of a self-cleaning operation is not completed.

Ultimately, the cat leaves litter box 20 for an interval long enough to exceed the preset time delay that is set into micro control 96. That time interval is subject to substantial variation; a range of two to seven minutes is usually desirable. The self-cleaning operation carried out by comb 43 should not be initiated while the cat is in the immediate vicinity because it is undesirable to cause the cat to have reason to be afraid of the litter box.

After the cat has left litter box 20 for a time exceeding the preset delay interval in micro control 96, FIG. 5, motor 55 is energized from battery 56 through microcontrol 96. As a consequence, gear 57 and shaft 41 are rotated in the direction of the arrow B in FIG. 1. The initial movement of the comb carriage comprising shaft 41, motor 55, and battery housing 56 is downwardly along track extensions 36 and 37. In the course of this downward movement of comb 43, its tines 44 are pushed downwardly into the litter in the bottom portion of housing 21, well below fill line 38. The bottoms of the tines, when this movement is completed, are quite close to the bottom 26 of the litter box housing but preferably don't quite engage the bottom of the housing; see FIG. 4.

Motor 55 remains energized and shaft 41 continues to rotate in the direction of arrow B. As a consequence, comb 43 is driven across the litter chamber defined by the housing 21 of box 20, from storage end 29 to discharge end 28, as indicated in FIG. 2 by arrow A. Reference may also be made to FIG. 4, where the position of the comb and its tines 44 are illustrated. As the comb moves across the litter box, in the direction of arrow A, tines 44 engage any clumps 71 present in the litter, whether generated by the elimination of liquid or solid wastes by the cat. Comb 43 carries those clumps toward the discharge position 28 at the far end of box 20, the right hand end of the litter box as seen in FIGS. 1 and 2. Comb 43 remains in a substantially erect position as shown in FIG. 2. It is prevented from rotating in the direction of arrow B by the engagement of auxiliary guide wheels 64 and 65 with tacks 32 and 33 respectively. The forward motion of the comb in the direction of arrow A is effected by rotation of shaft 41 in the direction of arrow B and the engagement of guide wheels 52 and 53 and their pins 52A and 53A in the apertures 32A and 33A of the two tracks 32 and 33 that define the comb path.

Ultimately, comb 48 advances to a position where its main guide wheels 52 and 53 reach the upwardly inclined extension portions 34 and 35 of tracks 32 and 33, respectively. Motor 55 is still energized; as a consequence, the carriage comprising shaft 41 moves up the ramps or track extensions 34 and 35 to the position shown in FIG. 3. During this upward movement of comb 43, lever 73 is engaged by the comb carriage and is pivoted upwardly from the original position shown in FIGS. 1 and 2 to the elevated position shown in FIG. 3. As a consequence, due to the engagement of pin 75 with a slot or like guide 77 in receptacle cover 69, cover 69 is opened, moving to the position shown in FIG. 3. When comb 43 reaches the discharge position shown in FIG. 3, the additional clumps 71 are discharged into receptacle 68 to join clumps 72 already present there.

When Comb 43 reaches the position of FIG. 3, it actuates one of the limit switches 95 of FIG. 5; the limit switch is not shown in the drawing and can be positioned to be actuated by any part of the comb or its carriage. The resulting output signal to micro control 96 (FIG. 5) reverses motor 55 and the motor starts to rotate shaft 41 in the direction of arrow C, FIG. 3. Accordingly, comb 43 is driven, by motor 55, back to its storage position illustrated in FIG. 1. In the process, discharge lever 73 is disengaged and drops back down to its original position, so that lid 69 on receptacle 68 again closes. The waste from litter box 20 is now totally enclosed in waste receptacle 68.

When comb 43 has finished its movement back to a point closely adjacent to storage end wall 25, its two main guide wheels 52 and 53 encounter the steeply inclined upward extensions 36 and 37 of tracks 32 and 33. Motor 55 remains energized and pulls comb 43 and its shaft 41 up to the position shown in FIG. 1. When the comb reaches that position, switch 58 is actuated by pin 61 and sets motor 55 for subsequent operation in the forward direction. When comb 43 reaches the end of its travel, at the position shown in FIG. 1, another of the comb limit switches 95 (FIG. 5) is actuated and a signal is supplied to micro control 96 to shut off the motor. A "home" sensor 94 may be provided for the same purpose. Usually, it is desirable to have both a home sensor 94 and a limit switch 95 (see FIG. 5) to actuate the micro control 96 and make sure that motor 55 is shut off with comb 43 at the storage position 29 shown in FIG. 1.

Figure 6:
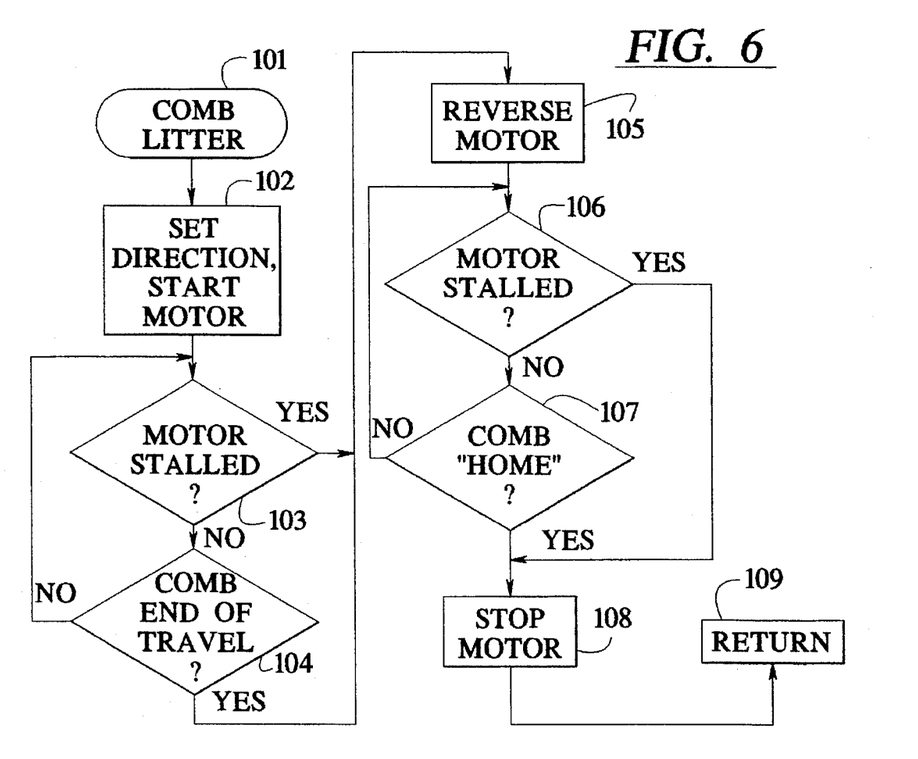
FIG. 6 is a flow chart for operation of the cat litter box of FIGS. 1–5.

FIG. 6 is a flow chart illustrating a subroutine programmed into micro control 96 (FIG. 5) for a self-cleaning operation in the improved litter box 20. The flow chart starts with a comb litter command 101 supplied to the micro control. As a consequence, a set direction and start command is supplied to motor 55 in step 102 of the subroutine. In the next step 103, if motor 55 is stalled, that condition is sensed and there is an output command to subsequent step 105 to reverse the direction of the motor. Ordinarily, however, the motor will not be stalled and the next step is to determine whether the comb is at its end of travel. If not, there is a feedback command to stage 103. If comb 43 is located at the discharge end of its travel, the output from stage 104 of the subroutine illustrated in the flow chart, FIG. 6, is applied to the reverse motor step 105. When the motor has been reversed, the condition of the motor is again checked to see if it is stalled. If so, there is an output signal to a subsequent stop mode step 108. Ordinarily, however, the motor will not be stalled and the next stage 107 of the flow chart receives an enabling signal to check and see whether the comb is n its "home" position. If not, a feedback signal is supplied to stage 106. When comb 43 reaches its "home" position, at storage end 29 of litter box 20, there is an output signal from stage 107 to a stop motor stage 108 which in turn supplies an output signal to a return stage 109. This Completes the subroutine of FIG. 6.

Figure 7:
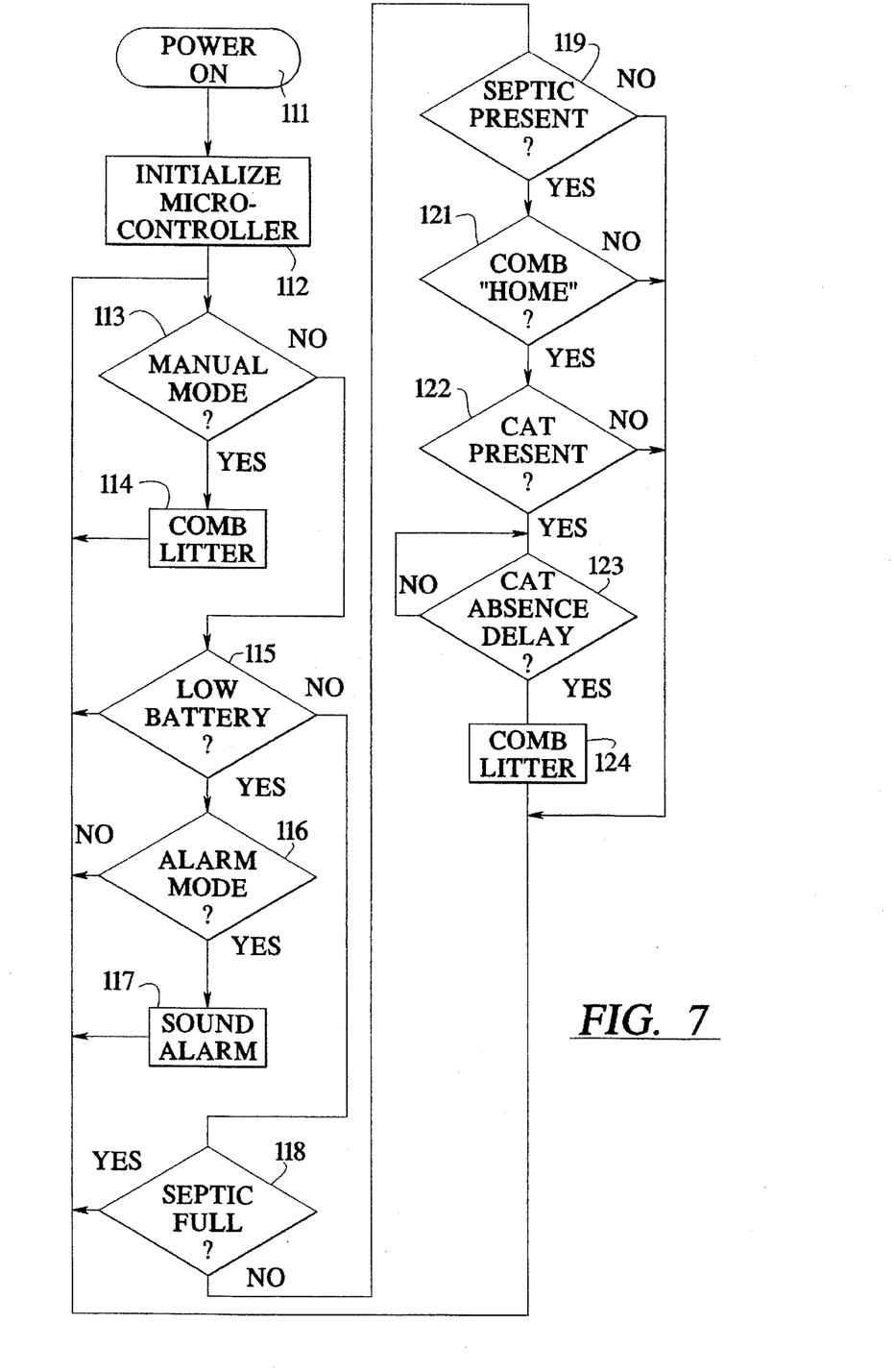
FIG. 7 is a detailed flow chart illustrating optional modes of operation for the controls of the automated self-cleaning cat litter box.

FIG. 7 illustrates a further subroutine that is also programmed into micro processor control 96 (FIG. 5). It starts with a power-on stage 111 that may be initiated by an appropriate switch (not shown) or may start simply with insertion of appropriate batteries into battery case 55 (FIGS. 1–3). The next stage 112 in this subroutine is initialization of the micro controller operation. In the next subroutine stage 113, the micro controller checks to determine whether the mode select switch 91 of FIG. 5 is set for manual mode. If it is, a comb litter procedure is initiated in step 114 and there is a feedback output back to subroutine stage 113. So long as the manual mode is maintained, self-cleaning of the litter box is continued on a cyclical basis. This may be desirable when the person using litter box 20 wants to make sure that all clumps have been removed from the litter in the box so that the litter can be replaced.

If the program is not set for manual mode, a NO output from stage 113 goes to he next stage 115 in the subroutine of FIG. 7 to check the condition of the batteries. If a low battery voltage condition is ascertained, there is an output to the next stage 116 which in turn may actuate a sound alarm stage 117 to produce a programmed output from buzzer 97 (FIG. 5) that alerts the use of litter box 20 that a change of batteries is required. Outputs from stages 116 and 117 may be fed back to stage 113 in this subroutine in appropriate circumstances. Ordinarily, however, when the voltages of the batteries are adequate, there is a NO output from stage 115 and it iS supplied to a stage 118 that determines whether the Septic or waste receptacle 68 (FIGS. 1–3) is full. Ordinarily, the receptacle will not be full but if it is, there is again a feedback signal supplied back to stage 113.

In normal circumstances, with adequate room in the septic receptacle, there is a NO output from stage 118 that is applied to a subsequent stage 119 in the subroutine of FIG. 7. The normal YES output from stage 119 goes to a subsequent stage 121 for the micro control to determine whether the comb of the self-cleaning litter box is at its home position as shown in FIG. 1. The YES output of stage 121 is applied to a subsequent subroutine stage 122 that determines whether a cat is present in the litter box. If a cat is present, there iS a YES output from stage 122 to a delay stage 123 in the program for this subroutine. When the cat leaves the litter box, a YES output from stage 123, after the appropriate delay of several minutes, is supplied to a comb litter stage 124 that is the last stage in this subroutine. The comb litter stage 124 is the source of the comb litter command 101 of FIG. 6. As shown in the flow chart of FIG. 7, NO outputs from either of the stages 121 and 122 result in a feedback signal to stage 113. The output from comb litter stage 124 at the end of the subroutine is also a feedback signal to stage 113.

The automated self,cleaning litter box 20 does not frighten or disturb a cat; the self-cleaning movement of comb 43 does not occur until there is a reasonable certainty that a cat using the litter box has been gone for two to seven minutes, depending on the delay set into the control after exit of a cat is determined before motor 55 is energized.

Other sensors can be used instead of photo detectors 82 and 94. For example, infra,red sensors receiving radiation from an appropriate I-R source, or a strain guage on pan bottom 26, will serve the same purpose as the photo detectors of FIGS. 1–4.

The gear drive connecting motor 55 to shaft 41 is not subject to fouling by the litter, which often includes powdery material that is likely to interfere with operation of other drive mechanisms such as a worm drive. Motor 55 should be sealed against dust and dirt, since it must operate in a rather adverse environment. Litter box 20 is simple and economical in construction, but should afford an extended operating life with little or no attention apart from periodic replacement of the litter and replacement of the batteries 56.

Figure 8:
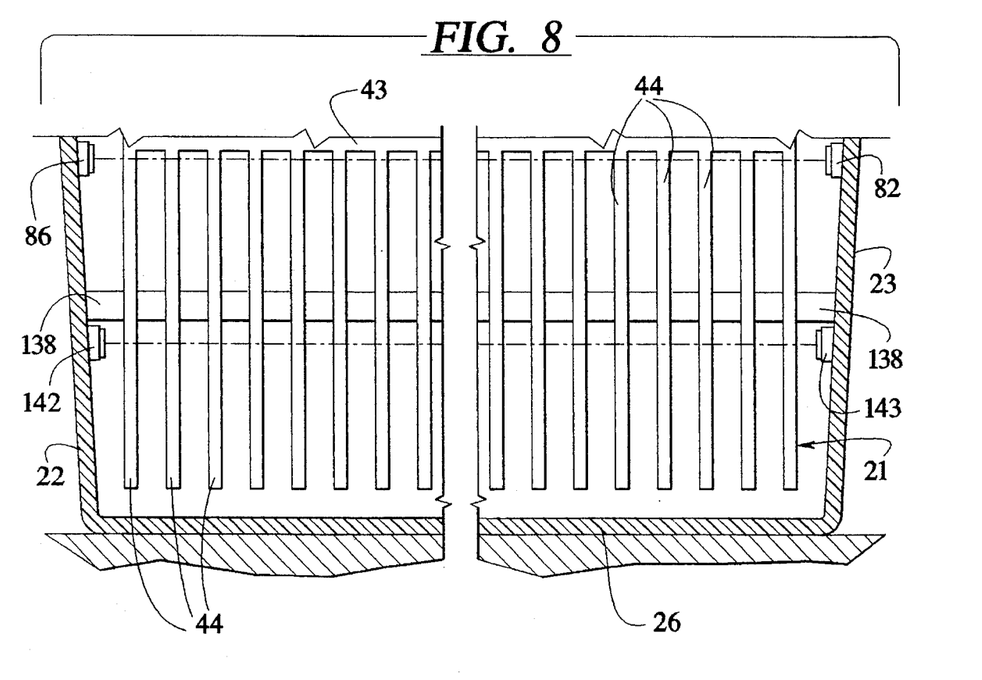
FIG. 8 is a detail view illustrating a litter level sensor.

The detail sectional view of FIG. 8, which is similar to FIG. 4, illustrates a sensor for determining whether there is an adequate supply of litter in the litter box. FIG. 8 again affords a sectional view of housing 21, including side walls 22 and 23 and bottom 26, Also shown are cat detector components comprising light source 86 and photo detector 82, both located well above an internal ridge 138 in the housing that indicates the desired upper level for the litter. Ridge 138 may be continuous around all sides of the litter box, or it may be interrupted if desired. Comb 43 and its tines 44 also appear in FIG. 8.

The variation shown in FIG. 8 also includes a sensor for determining whether there is an adequate supply of litter in the litter box. The litter level sensor comprises a radiation source 142 mounted on the inside of housing wall 22 in alignment with a detector 143 that is mounted on wall 23. Devices 142 and 143i are selected to work together; if the radiation from source 142 is in the visual range, detector 143 is a photo sensor. If an infra red source is used, an infra red detector becomes necessary. Devices 142 and 143 are located immediately below the level indicator 138. If radiation from source 142 reaches detector 143, the level of litter in housing 21 is insufficient and should be supplemented. The litter level sensor 142, 143 is used to actuate an appropriate alarm 97, FIG. 5.

Figure 9:
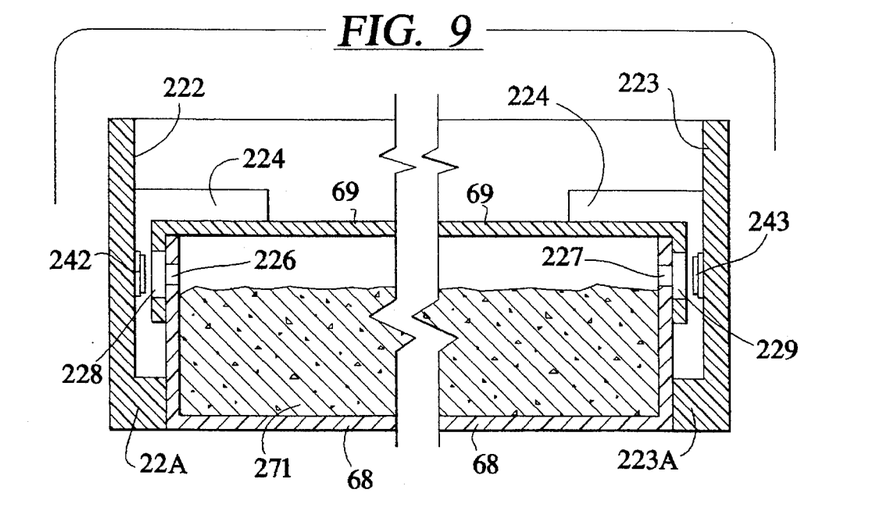
FIG. 9 is a detail view showing a full-receptacle sensor system.

In the detail section view of FIG. 9, the waste receptacle 68 and its lid 69 are shown in closed condition. There is a mass 271 of Waste in receptacle 68, but the receptacle is not yet full. Receptacle 68 is positioned in the litter box by engagement with bosses 222A and 223A on the bottoms of two litter box wall extensions 222 and 223 which may be affixed to litter box housing walls 22 and 23, respectively; see FIGS. 1–3. The position of receptacle 68 may also be determined by engagement with two lateral extensions 224 of walls 222 and 223.

In the arrangement shown in FIG. 9, the walls of waste receptacle 68 and cover 69 adjacent extension/positioning wall 222 are provided with aligned openings 226 and 228, respectively. At the other side of the waste receptacle, adjacent positioning wall 223, the waste receptacle and its cover have similar aligned openings 227 and 229, respectively. Moreover, holes 226 and 228 are aligned with apertures 227 and 229 so that radiation from a source 242 on wall 222 impinges upon a detector 243 on wall 223 as long as the level of waste 271 in receptacle 68 does not block the radiation.

When receptacle 68 is full, the waste in the receptacle cuts off the radiation, so that there is no longer an output from detector 243. Consequently, the sensor system 242, 243 of FIG. 9 is able to actuate an alarm 97 (FIG. 5) to signal to the user that waste receptacle 68 is full and should be replace.

I claim:

1. In an improved self-cleaning cat litter box including:

a pan-shaped housing having a bottom and two spaced side walls connecting a storage end wall to a discharge end wall, the housing defining an upwardly open litter chamber to be filled to a given fill level with cat litter;

a comb path extending from the storage end wall to the discharge end wall;

a comb extending between the side walls; and a comb drive for driving the comb along the comb path from a storage position adjacent the storage end wall to a discharge position adjacent the discharge end wall and back to the storage position, the comb projecting down into the litter chamber to a level below the fill level and near the housing bottom while the comb moves toward the discharge end wall so that the comb engages any clumps in the litter and carries such clumps to the discharge position;

the improvement comprising:

a cat exit sensor for sensing exit of a cat from the litter chamber;

delay means, connected to the cat exit sensor and to the comb drive, for actuating the comb drive to drive the comb from the storage position to the discharge position and back to the storage position at a predetermined time subsequent to sensing of exit of a cat from the litter chamber and a litter level sensor for sensing an insufficient quantity of litter in the litter chamber, below the given fill level.

2. An improved cat litter box according to claim 1, and further comprising:

a waste receptacle located outside of the litter chamber adjacent to the discharge end wall; and deflection means, on the comb path, for deflecting the comb to deposit clumps carried by the comb into the waste receptacle.

3. An improved cat litter box according to claim 2 in which:

the waste receptacle includes a base pan and a cover hinged to the base pan; and the deflection means raises the cover of the waste receptacle to enable deposit of clumps in the base pan, of the waste receptacle.

4. An improved cat litter box according to claim 2 in which the waste receptacle comprises:

a base pan for receiving and storing cat waste from the litter box;

a cover hinged to and normally covering the base pan; and guide means, on the cover, engageable by the deflection means of the litter box to raise the cover to an open position.

5. An improved cat litter box according to claim 1 in which the cat exit sensor comprises:

radiation source, mounted adjacent one side of the litter chamber, the radiation source producing a beam that projects across the litter chamber above the fill level; and a detector mounted adjacent the other side of the litter chamber in position to intercept the beam from the radiation source.

6. An improved cat litter box according to claim 5 in which:

the radiation source is a light source and the beam is a light beam;

the detector is a photodetector; and the light source and the photodetector are mounted on opposite side walls of the litter chamber.

7. An improved cat litter box according to claim 1 in which the litter level sensor comprises:

a radiation source, mounted adjacent one side of the litter chamber, the radiation source producing a beam that projects across the liter chamber below the fill level; and a detector mounted adjacent the other side of the litter chamber in position to intercept the beam from the radiation source.

8. In an improved self-cleaning cat litter box including:

a pan-shaped housing having a bottom and two spaced side walls connecting a storage end wall to a discharge end wall, the housing defining an upwardly open litter chamber to be filled to a given fill level with cat litter;

a comb path extending from the storage end wall to the discharge end wall;

a comb extending between the side walls; and a comb drive for driving the comb along the comb path from a storage position adjacent the storage end wall to a discharge position adjacent the discharge end wall and back to the storage position, the comb projecting down into the litter chamber to a level below the fill level and near the housing bottom while the comb moves toward the discharge end wall so that the comb engages any clumps in the litter and carries such clumps to the discharge position;

the improved construction comprising:

a track member, defining the comb path, mounted on one side wall above the fill level;

a carriage supporting the comb;

a guide wheel mounted on the carriage and engaging the track member;

and a reversible drive motor, comprising a part of the comb drive, mounted on the carriage.

9. An improved cat litter box according to claim 8, in which the carriage includes a comb shaft extending across the litter chamber from one side wall to the other, and further comprising:

a second track member mounted on the other side wall above the fill level; and a second guide wheel mounted on the carriage and engaging the second track member.

10. An improved cat litter box-according to claim 9 in which:

each track member has a multiplicity of equally spaced perforations along the track;

and further comprising:

a first drive wheel mounted on one end of the comb shaft and having a plurality of radial drive pins engageable in the perforations of the first track member; and a second drive wheel mounted on the other end of the comb shaft and having a plurality of radial drive pins engageable in the perforations of the second track member.

11. An improved cat litter box according to claim 10 in which the drive means comprises a gear train connecting the motor to the comb shaft to rotate the comb shaft.

12. An improved cat litter box according to claim 11 in which each track member includes an upwardly inclined extension at its opposite ends so that the comb is directed upwardly above the fill level at both ends of the litter chamber.

13. An improved cat litter box according to claim 8 and further comprising:

a cat exit sensor for sensing exit of a cat from the litter chamber; and delay means, connected to the sensor and to the reversible motor, for actuating the comb drive motor to drive the comb from the storage position to the discharge position at a predetermined time interval subsequent to sensing of exit of a cat from the litter chamber.

14. An improved cat litter box according to claim 13, and further comprising:

a waste receptacle located outside of the litter chamber adjacent to the discharge end wall; and deflection means, on the comb path, for deflecting the comb to deposit clumps carried by the comb into the waste receptacle.

15. An improved cat litter box according to claim 14 in which:

the waste receptacle includes a base pan and a cover hinged to the base pan; and the deflection means raises the cover of the waste receptacle to enable deposit of clumps in the base pan of the waste receptacle.

16. An improved cat litter box according to claim 13 in which the cat exit sensor comprises:

a radiation source, mounted adjacent one side of the litter chamber, the radiation source producing a beam that projects across the litter chamber above the fill level; and a detector mounted adjacent the other side of the litter chamber in position to intercept the beam from the radiation source.

17. An improved cat litter box according to claim 16 in which:

the radiation source is a light source and the beam is a light beam;

the detector is a photodetector; and the light source and the photodetector are mounted on opposite side walls of the litter chamber.

18. An improved cat litter box according to claim 8 and further comprising:

a litter level sensor for sensing an insufficient quantity of litter in the litter chamber, below the given fill level.

19. An improved cat litter box according to claim 18 in which the litter level sensor comprises:

a radiation source mounted adjacent one side of the litter chamber, the radiation source producing a beam that projects across the latter chamber below the fill level; and a detector mounted adjacent the other side of the litter chamber in position to intercept the beam from the radiation source.

20. In an improved self-cleaning cat litter box including:

a pan-shaped housing having a bottom and two spaced side walls connecting a storage end wall to a discharge end wall, the housing defining an upwardly open litter chamber to be filled to a given fill level with cat litter;

a comb path extending from the storage end wall to the discharge end wall;

a comb extending between the side walls;

a comb drive for driving the comb along the comb path from a storage position adjacent the storage end wall to a discharge position adjacent the discharge end wall and back to the storage position, the comb projecting down into the litter chamber to a level below the fill level and near the housing bottom while the comb moves toward the discharge end wall so that the comb engages any waste clumps in the litter and carries such waste clumps to the discharge position; and a waste receptacle locate outside of the litter chamber adjacent to the discharge end wall, for receiving waste carried to the discharge end of the litter box by the comb;

the improved construction comprising:

a waste receptacle sensor for sensing filling of the waste receptacle;

an excess waste alarm actuated by the waste receptacle sensor;

a litter level sensor for sensing an insufficient quantity of litter in the litter chamber, below the given fill level; and an insufficient litter alarm actuated by the litter level sensor.

21. An improved cat litter box according to claim 20 in which the waste receptacle sensor comprises:

a radiation source, mounted on an extension of one side wall beyond the discharge end wall, the radiation source producing a beam that projects across the waste receptacle; and a detector, mounted on an extension of the other side wall beyond the discharge end wall, positioned to intercept the beam from the radiation source.

22. An improved cat litter box according to claim 20 in which the litter level sensor comprises:

a radiation source, mounted adjacent one side of the litter chamber, the radiation source producing a beam that projects across the litter chamber below the fill level; and a detector mounted adjacent the other side of the litter chamber in position to intercept the beam from the radiation source.

* * * * *